Patented Aug. 25, 1953

2,650,222

UNITED STATES PATENT OFFICE 2,650,222

2-AMINO-3,4-DIHYDROQUINOXALINE COMPOUNDS AND PROCESS FOR THEIR PREPARATION

Karl Pfister III, Westfield, and John Weijlard, Maplewood, N. J., assignors to Merck & Co., Inc., Rahway, N. J., a corporation of New Jersey No Drawing. Original application October 23, 1948, Serial No. 56,256. Divided and this application April 19, 1952, Serial No. 283,251

15 Claims. (Cl. 260—250)

This invention relates to an improved method generally applicable for the preparation of 2-aminoquinoxaline compounds which are important intermediates in the manufacture of the corresponding sulfaquinoxalines. The sulfaquinoxalines are bacteriostatic agents especially useful in veterinary medicine. They are also of value as antimalarial agents.

This application is a division of our copending application Serial No. 56,256, filed October 23, 1948.

2-aminoquinoxaline, the precursor of sulfaquinoxaline, has been prepared previously by hydrolysis and decarboxylation of alloxazine, which is ordinarily prepared by reacting ortho-phenylenediamine with alloxan. The alloxan starting material, however, is costly and relatively non-available and the hydrolysis procedure ordinarily employed, which utilizes concentrated ammonium hydroxide under pressure, involves the use of high pressure equipment and gives low yields.

We have now discovered, however, a new and improved process for preparing 2-aminoquinoxaline which employs available and relatively inexpensive starting materials and which does not require the use of high pressures. We have further discovered that this novel process is generally applicable for preparing 2-aminoquinoxaline compounds containing substituents in the benzenoid nucleus and, in particular those 2-aminoquinoxalines which contain halo, alkyl or alkoxy substituents.

This process may be chemically represented as follows:

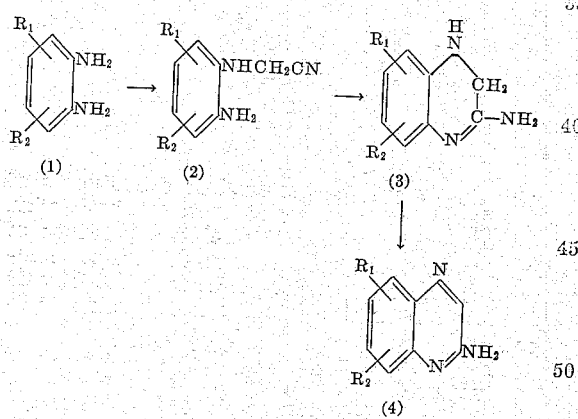

wherein $R_1$ and $R_2$ are nuclear substituents of the class which consists of hydrogen, halo, alkyl and alkoxy radicals.

The reactions indicated above are carried out as follows: a 1,2-diamino-benzene compound (1) is reacted with formaldehyde and hydrogen cyanide, or with glycolonitrile, or with a haloacetonitrile to produce an N(o-aminophenyl)-glycine nitrile compound (2); this compound is then treated, in methanolic solution, with a strong base, thereby cyclizing the nitrile to produce the corresponding 2-amino-3,4-dihydroquinoxaline compound (3) which is converted to the corresponding 2-aminoquinoxaline compound (4) by treatment with an oxidizing agent.

The 1,2-diamino-benzene compounds, which can be used as starting materials in practicing the present invention are those compounds which can be chemically represented as follows:

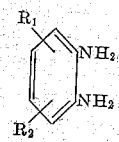

wherein $R_1$ and $R_2$ are nuclear substituents of the class which consists of hydrogen, halo, alkyl and alkoxy radicals. This class of starting materials includes ortho-phenylenediamine, halogenated ortho-phenylenediamines such as 3-chloro-1,2-diaminobenzene, 4-chloro-1,2-diaminobenzene, and the like, alkylated ortho-phenylenediamines, such as 3-methyl-1,2-diaminobenzene, 4-methyl-1,2-diaminobenzene, 4,5-dimethyl-1,2-diaminobenzene, 4-ethyl-1,2-diaminobenzene, 4-isopropyl-1,2-diaminobenzene, and the like, and alkoxy substituted ortho-phenylenediamines, such as 4-methoxy-1,2-diaminobenzene, 3-methoxy-1,2-diaminobenzene, 4,5-dimethoxy-1,2-diaminobenzene, 4-ethoxy-1,2-diaminobenzene, 3-propoxy-1,2-diaminobenzene, and the like.

The conversion of the 1,2-diaminobenzene compound to the corresponding N-(o-aminophenyl)-glycine nitrile compound can be accomplished by reacting said 1,2-diaminobenzene compound with glycolonitrile. This reaction is conveniently carried out using equimolecular quantities of reactants, although an excess of diamine may be utilized if desired. An excess of glycolonitrile over the diamine, however, should be avoided since this results in the increased formation of the unwanted N,N'-dicyanomethyl-o-phenylenediamine. For example, when an excess (about 10%) of glycolonitrile is employed, an increase in physical yield results but the product is of poor quality and contains a high proportion of the dicyano derivative. It is therefore preferred to employ equimolecular proportions of reactants.

The reaction is ordinarily conducted by heating the reactants in solution preferably using water or aqueous alcohol as the solvent. When the reaction is carried out in alcoholic media, however, the product obtained is ordinarily of poor quality; it is therefore preferred to conduct the reaction by heating the reactants using water as the only solvent. The reaction temperature is critical in that no reaction occurs below about 45° C. and it has been found desirable to employ a reaction temperature of at least about 60° C. Although temperatures up to 95° C. have given excellent yields of good quality material, it is ordinarily preferred to conduct the reaction at a temperature between 60 and 65° C. The pH during the reaction is also critical and should be adjusted to between about 6.0 and 7.0. No reaction occurs at pH=3; at pH values above about 7.0, the product is gummy. At a pH value within the range 6.0–6.2, the yield and quality of the product is satisfactory, but the condensation requires a temperature of at least about 90° C. It is therefore ordinarily preferred to employ a pH within the range of 6.5–7.0 under which conditions the reaction proceeds satisfactorily at the preferred temperature of 60–65° C. The optimum reaction time varies depending on the temperature and the pH; at 60–65° C., the reaction is ordinarily allowed to proceed for approximately two hours; at 90–95° C. the reaction is about 80% completed in 8 minutes and is substantially complete in ½ hour; no appreciable change in yield results when the condensation time is increased from ½ hour to one hour at 90–95° C. When the reaction is carried out in water, the N-(o-aminophenyl)-glycine compound precipitates directly from the aqueous reaction mixture and is recovered by filtration.

Instead of glycolonitrile, a haloacetonitrile, such as chloroacetonitrile or bromoacetonitrile, can be reacted with the 1,2-diaminobenzene compound to produce the desired N-(o-aminophenyl)-glycine nitrile compound. This reaction is conveniently carried out by heating the diamine and the haloacetonitrile in the presence of a base, such as pyridine. It is ordinarily preferred to conduct the reaction by heating substantially equimolecular proportions of the reactants in solution in a lower aliphatic alcohol. It is important to avoid using an excess of haloacetonitrile since this results in appreciable formation of unwanted N,N'-dicyano-1,2-diaminobenzene by-products. The desired N-(o-aminophenyl)-glycine-nitrile compound is conveniently separated from the reaction mixture by triturating said mixture with water (after evaporation of the alcohol when the reaction is carried out in this solvent) thereby precipitating the desired nitrile as a granular product.

The presently preferred process for accomplishing the conversion of the 1,2-diaminobenzene compound to the corresponding N-(o-aminophenyl)-glycine-nitrile compound is by reacting said diamino-compound with formaldehyde and hydrogen cyanide. As in the case of the reactions employing glycolonitrile or haloacetonitrile, it has been found best to employ approximately equimolecular proportions of reactants and, in particular, to avoid using an excess of formaldehyde and hydrogen cyanide, since this results in production of considerable amounts of the unwanted N,N'-dicyano-1,2-diamino-benzene compound.

The procedure can be carried out by first reacting the 1,2-diaminobenzene compound, such as o-phenylenediamine, with formaldehyde in the presence of sodium bisulfite, and treating the reaction mixture, without purification, with a cyanide salt, such as an alkali cyanide. The reaction between the 1,2-diaminobenzene compound, formaldehyde and sodium bisulfite is conveniently conducted in aqueous solution at a temperature below about 60° C. The resulting mixture is then reacted, without further treatment, with a cyanide salt, the reaction being carried out at a temperature of about 80–85° C. The N-(o-aminophenyl)-glycine nitrile compound thus produced is isolated directly from the reaction solution by cooling and crystallizing.

An improved modification of the above procedure involves reacting the 1,2-diaminobenzene compound with hydrogen cyanide and formaldehyde, said reaction being carried out in water or preferably water plus sufficient methanol or other water-miscible lower aliphatic alcohol solvent to dissolve the diamine. The hydrogen cyanide utilized in the reaction is conveniently prepared in situ by reacting a cyanide salt with an acid. This is ordinarily accomplished by adding an aqueous solution of the cyanide salt to a mixture containing the 1,2-diaminobenzene compound, water or methanol, and aqueous hydrochloric acid. The quantities of reagents are preferably adjusted so that the pH of the resulting mixture is approximately 6.5–7.0. If desired, a smaller quantity of hydrochloric acid may be used in the initial mixture and the resulting alkaline cyanide solution acidified to a pH of 6.5–7.0 by the subsequent addition of hydrochloric acid. Instead of using a cyanide salt plus hydrochloric acid, the proper amount of hydrogen cyanide can be added to a mixture of the diamine and water; or diamine, water and methanol (or other lower aliphatic alcohol solvent), which automatically gives the proper pH. The reaction is preferably carried out by adding the formaldehyde to a mixture containing the other components, at the same time maintaining the temperature below about 45° C. The N-(o-aminophenyl)-glycine nitrile compound, thus produced crystallizes during the course of the reaction and is recovered from the resulting slurry by filtration and centrifugation.

When the previously enumerated 1,2-diaminobenzene compounds are treated according to one of the foregoing procedures, there are obtained the corresponding substituted N-(o-aminophenyl)-glycine nitrile compound having the formula:

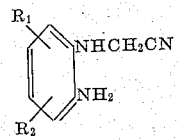

wherein $R_1$ and $R_2$ are nuclear substituents of the class which consists of hydrogen, halo, alkyl and alkoxy radicals. The relative positions of these substituent groupings in said nitrile compounds depends on the directive effect of said substituents on the entering cyanomethyl radical.

The cyclization of the N-(o-aminophenyl)-glycine nitrile compound is accomplished by treating said N-(o-aminophenyl)-glycine nitrile compound with a methanolic solution of a strong base, such as sodium hydroxide, potassium hydroxide, sodium methylate, trimethylbenzylammonium hydroxide, trimethylphenylammonium hydroxide, and the like. The cyclization is preferably conducted under an inert atmosphere, such as nitrogen, but this is not essential. In fact, if desired, oxygen can be bubbled through the reaction mixture during the cyclization, thereby cyclizing the nitrile compound and, at the same time, oxidizing the intermediate 3,4-dihydroquinoxaline compound produced by said cyclization operation. It is ordinarily preferred, however, to conduct the cyclization under non-oxidizing conditions and then to oxidize the cyclization product in a separate oxidation step.

We have discovered that methanol is an essential component of the cyclization solution. Surprisingly enough, we have found that other lower aliphatic alcohols, such as ethanol, isopropanol and butanol are unsatisfactory for carrying out the cyclization reaction. Although it is possible to carry out the cyclization in aqueous methanol, we have found that the addition of water in excess of about 1% lowers the yield. We therefore prefer to employ substantially anhydrous methanol as the solvent for this reaction.

The base employed should be approximately equivalent stoichiometrically to the N-(o-aminophenyl)-glycine nitrile. Amounts of base varying between 0.5 and 1.2 times the stoichiometric equivalent of the nitrile have given satisfactory results; cyclization employing molecular proportions of base below or above this range have resulted in decreased yield of the desired product.

It has been found that the cyclization reaction can be carried out at temperatures within the range of about 0° C. to 60° C. It is preferred, however, to conduct the cyclization at a temperature between about 25° C. and 55° C., at which temperatures excellent yields of cyclization product are obtained. The time required for the obtainment of maximum yield varies depending on the temperature and the proportion of solvent from at least 10 hours for cyclizations conducted at 55° C. to about 72 hours for cyclizations at 25° C. Longer cyclization periods have little or no effect on the yield. The 2-amino-3,4-dihydroquinoxaline compound produced is conveniently isolated from the cyclization reaction mixture by evaporating most of the methanol and diluting the concentrate with water and cooling, whereupon said 2-amino-3,4-dihydroquinoxaline compound crystallizes and can be recovered by conventional means.

When the aforementioned substituted N-(o-aminophenyl)-glycine nitrile compounds are treated according to the above-disclosed cyclization procedures, there are obtained the corresponding substituted 2-amino-3,4-dihydroquinoxaline compounds of the formula:

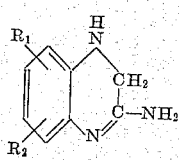

wherein $R_1$ and $R_2$ are nuclear substituents of the class which consists of hydrogen, halo, alkyl and alkoxy radicals.

These 2-amino-3,4-dihydroquinoxaline compounds are converted to the corresponding 2-aminoquinoxaline compound by reacting said 2-amino-3,4-dihydroquinoxaline compound with an oxidizing agent. The substituent groupings in the previously disclosed halogenated, alkylated and alkoxy substituted 2-amino-3,4-dihydroquinoxalines are not affected by the oxidation treatment with the result that the product in each case is the corresponding halogenated, alkylated or alkoxy substituted 2-amino-quinoxaline compound of the formula:

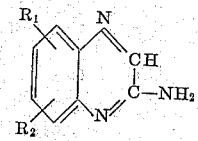

wherein $R_1$ and $R_2$ are nuclear substituents of the class which consists of hydrogen, halo, alkyl and alkoxy radicals.

The oxidizing agents ordinarily employed in this reaction include alkaline potassium ferricyanide, hydrogen peroxide under either acid or alkaline conditions, palladium-activated charcoal, ferric chloride, air, oxygen; it is ordinarily preferred to use hydrogen peroxide. When hydrogen peroxide is used as the oxidizing agent, it is preferably employed in conjunction with materials which are known to catalyze the decomposition of hydrogen peroxide, such as ferrous chloride. A list of such decomposition catalysts is given on page 24 of the text "Reference Book of Inorganic Chemistry" by Latimer and Hildebrand, N. Y., 1937, MacMillan Co.

The reaction between the 2-amino-3,4-dihydroquinoxaline compound and alkaline potassium ferricyanide is best carried out by heating the reactants in aqueous solution, preferably at a temperature of approximately 80–85° C. When alkaline hydrogen peroxide is used as the oxidizing agent, any temperature from about 0° C. to over 70° C. can be employed. The reaction between the 2-amino-3,4-dihydroquinoxaline compound and hydrogen peroxide takes place spontaneously with evolution of heat and the reaction temperature is ordinarily maintained within the preferred range by cooling the reaction mixture. If desired, however, the reaction mixture can be heated at the start of the reaction, thereby shortening the total reaction time. The time ordinarily required for the oxidation varies depending on the concentration of oxidizing agent, temperature of oxidation, etc., from about 30 minutes up to about 4 hours. The reaction solution is then cooled and the desired 2-aminoquinoxaline compound crystallizes directly therefrom and is recovered by filtration or centrifugation.

The reaction between the 2-amino-3,4-dihydroquinoxaline compound and palladium-activated charcoal is carried out by heating the reactants under reflux in tetralin solution. Under these conditions the reaction is substantially complete in approximately 1 hour. The catalyst is removed from the reaction mixture, while still hot, by filtration or centrifugation, and the resulting tetralin solution is cooled to crystallize the desired 2-aminoquinoxaline compound. This crude product is recovered by filtration, washed with petroleum ether, and may be further purified by precipitation from its solution in aqueous mineral acid by the addition of an alkaline material.

When ferric chloride, hydrogen peroxide, or oxygen are employed as the oxidizing agent, the reaction is conveniently conducted by adding the oxidizing agent directly to the methanolic cyclization soltuion, thus avoiding the need for isolating the 2-amino-3,4-dihydroquinoxaline compound. Moreover, a simultaneous cyclization and oxidation can be accomplished thereby converting the o-(aminophenyl)-glycine nitrile compound directly to the 2-aminoquinoxaline compound in a single operation.

The following examples illustrate methods of carrying out the present invention, but it is to be understood that these examples are given by way of illustration and not of limitation.

Example 1

A suspension of 108 g. of o-phenylenediamine in 200 cc. of water was treated with a freshly made solution of 114.4 g. of sodium bisulfite and 90 g. of 36% formaldehyde solution in 200 cc. of water. The mixture, which became slightly warm, was stirred for 2 hours, when solution became complete. After standing overnight at room temperature this solution was warmed to 60° C. for 4 hours and then treated with a solution of 54 g. of sodium cyanide in 100 cc. of water. The mixture was held at 80–85° C. for 30 minutes, then cooled to 20° C., filtered, and the filtered product washed with ice water. The wet product was substantially dissolved in 400 cc. of hot isopropanol, some insoluble material filtered off, and the filtrate chilled to 2° C. overnight. The crystals were collected, washed with cold isopropanol and dried to give 62 g. (42% of theory) of product; M. P.=103–105° C. Recrystallization of this material from benzene gave pure N-(o-aminophenyl)-glycine nitrile as lustrous leaflets of M. P. 110.5–111° C.; Anal. Calc'd. for $C_8H_9N_3$: C. 65.27; H, 6.16; N, 28.54. Found: C, 65.07; H, 6.31; N, 28.75.

Example 2

A mixture of 5.4 g. of o-phenylenediamine, 3.8 g. of chloroacetonitrile, 4.0 g. of pyridine and 50 cc. of ethyl alcohol was heated under reflux for 3 hours. The solution was concentrated nearly dry and granulated with water. The precipitate was filtered off, washed and dried to give 2.3 g. (31.8% of theory) of crude N-(o-aminophenyl)-glycine nitrile; M. P. 102–105° C. A mixture of this product with material prepared as in Example 1 showed no depression in melting point.

Example 3

To a solution of 27.0 g. of o-phenylenediamine in 120 cc. of 2.5 N hydrochloric acid and 55 cc. of methanol was added 14.7 g. of sodium cyanide. With the temperatures at 40–45° C., 20.8 g. of 36–38% solution of formaldehyde in water was added over 15 minutes. Slight cooling was necessary to keep the temperature below 45° C. When about ½ of the formaldehyde was added, a crystalline precipitate of N-(o-aminophenyl)-glycine nitrile appeared. The slurry was stirred for an hour at room temperature and an hour at 0–5° C. before filtration. The residue was washed free of chloride with cold water, and recrystallized from 60 cc. of boiling isopropanol without being dried. After holding at 0–5° C. for 4–6 hours, the crystalline product was collected, washed with ice-cold isopropanol and dried. The weight of the N-(o-aminophenyl)-glycine nitrile was 30.6 g. or 83.1% of theory; M. P.=104–106° C. By the method of solubility analysis, this material was shown to be over 80% pure. The chief impurity was N,N'-dicyanomethyl-o-phenylenediamine.

Example 4

250 cc. of water, 135.00 gms. (1.25 moles) of o-phenylenediamine and 145½ gms. of 50% aqueous solution of glycolonitrile (1.25 moles) are mixed together and heated to about 30–35° C. The initial pH of this solution which is about 6 is adjusted to 6.5–7.0 by the addition of 2.5 N sodium hydroxide solution, about 5 cc. being required. The resulting mixture (volume about 500 cc.) is then heated to 60–65° C. and maintained at this temperature for approximately 2 hours. Mild heat evolution occurs for about 1 hour from the time the mixture reaches a temperature of approximately 60° C. The diamine dissolves at 50° C. and, after about 20 minutes at a temperature of 60–65° C., an oil separates which upon seeding becomes crystalline. After the 2 hour heating period, the reaction mixture is cooled to room temperature and maintained at this temperature for at least 2 hours. The reaction mixture is then filtered and the crystalline product washed with three 100 cc. portions of water and dried at 45–50° C. to produce 151–156.5 gms. of sandy, light brown N-(o-aminophenyl)-glycine nitrile; M. P. 101–105° C.; yield approximately 82–85% of theory.

Example 5

Equimolecular quantities of o-phenylenediamine and glycolonitrile were reacted together substantially as described in Example 4, except that double the amount of water was employed. The quantity of N-(o-aminophenyl)-glycine nitrile obtained was 84½% of that theoretically obtainable; M. P. 95–98° C.

Example 6 o-Phenylenediamine was reacted with glycolonitrile substantially as described in Example 4, except that 10% excess of glycolonitrile was employed. The quantity of N-(o-aminophenyl)-glycine nitrile obtained was approximately 93% of that theoretically obtainable; M. P. 85–95° C.

Example 7 o-Phenylenediamine and glycolonitrile were reacted together substantially as described in Example 4, except that only 94% of the theoretical quantity of the glycolonitrile was employed. The quantity of N-(o-aminophenyl)-glycine nitrile thus obtained was 82.2% of theory; M. P. 102–105° C.

Example 8

Equimolecular amounts of o-phenylenediamine and glycolonitrile (50% aqueous solution in water) were heated together at a temperature of 90–95° C. for a period of 1 hour. The resulting mixture of N-(o-aminophenyl)-glycine nitrile was solid on cooling; M. P. 82–95° C. This product was recrystallized from isopropanol to produce N-(o-aminophenyl)-glycine nitrile; M. P. 104–105° C.; yield approximately 63.3% of theory.

Example 9 o-Phenylenediamine was reacted with glycolonitrile substantially as described in Example 4 except that only 94% of the theoretical equivalent of glycolonitrile was employed. As a result of the phosphoric acid added by the manufacturer to stabilize the glycolonitrile, the pH of the starting material thus prepared was about 6.0–6.2. Under these slightly acid conditions, no reaction occurred until the temperature reached 90° C. After ½ hour at 90° C. the reaction mixture was treated as described in Example 4 to produce N-(o-aminophenyl)-glycine nitrile in a yield of approximately 88.7% of theory; M. P. 88–89° C.

Example 10

Condensation between glycolonitrile and o-phenylenediamine was carried out substantially as described in Example 4 except that the reaction mixture was heated at 90–95° C. for a period of only 8 minutes. The reaction mixture was then treated as described in Example 4 to produce N-(o-aminophenyl)-glycine nitrile in a yield of 70.4% of theory; M. P. 90–94° C.

Example 11

135.0 gms. (1.25 moles) of o-phenylenediamine was mixed with 250 cc. of water and the mixture heated to 90–95° C. 142.5 gms. of 50% aqueous solution of glycolonitrile (1.25 moles) was added to this solution while maintaining the reaction temperature at 90–95° C. The reaction mixture was then heated for an additional ½ hour at 90–95° C. cooled to room temperature and the crude N-(o-aminophenyl)-glycine nitrile was isolated therefrom and dried substantially as described in Example 4; M. P. 91–93° C. Yield = 89.6% of theory. After recrystallization from isopropanol, the yield was 61.9% of substantially pure material; M. P. 104–105° C.

Example 12

Equimolecular amounts (1¼ mole) of o-phenylenediamine and technical glycolonitrile (50% aqueous solution) were heated together, without additional diluent, at 90–95° C. for a period of approximately ½ hour. 75 cc. of isopropanol was added to the reaction mixture and the reaction mixture was cooled in ice and the crystalline product, which separated, recovered by filtration and dried to produce a yield of N-(o-aminophenyl)-glycine nitrile in a yield of approximately 74.5% of theory; M. P. 99–102° C.

This reaction was carried out as described above, except that the reaction mixture was heated at 90–95° C. for 1 hour. The yield and quality of the product was identical with that obtained in the foregoing experiment.

Example 13

135.0 gms. of o-phenylenediamine, 142.5 gms. of 50% aqueous solution of glycolonitrile and 250 cc. of water were mixed together and the pH of the mixture adjusted to about 6.5–7.0. The resulting mixture was then heated at a temperature of 90–95° C. for a period of 1 hour, 50 cc. of isopropanol was added to the hot mixture and the resulting mixture was cooled to 0–5° C. The crystalline product which separated was recovered by filtration and dried at 45–50° C. to produce crude N-(o-aminophenyl)-glycine nitrile in a yield of approximately 78% of theory; M. P. 92–98° C.

Example 14

¼ mole of o-phenylenediamine and ¼ mole of glycolonitrile (50% aqueous solution) were mixed with 55 cc. of methanol in 127 cc. of water and the pH of the mixture was adjusted to 6.5–7.0. The resulting mixture was heated at 60–65° C. for approximately 1 hour. The reaction mixture was cooled at 0° C.; the crystalline product which separated was recovered by filtration and dried to produce crude N-(o-aminophenyl)-glycine nitrile in a yield of 77% of theory; M. P. 88–100° C.

Example 15

¼ mole of o-phenylenediamine was dissolved in a mixture containing 24 cc. of methanol and 24 cc. of water and the pH of the solution was adjusted to 6.5–7.0. The resulting solution was heated to 75–80° C. and ¼ mole of glycolonitrile was added to the resulting solution over a period of 40 minutes while maintaining the temperature of the resulting mixture at 75–80° C. The resulting solution was heated at this temperature for an additional ½ hour period and then cooled to room temperature. The material which precipitated was recovered by filtration and dried to produce a crystalline product; M. P. below 75° C.; assuming the product to be N-(o-aminophenyl)-glycine nitrile, the yield was approximately 63% of theory.

Example 16

A suspension of 51 g. of N-(o-aminophenyl)-glycine nitrile in 400 cc. of methanol was treated with a solution of 8.05 g. of sodium in 350 cc. of methanol and the mixture agitated until solution was essentially complete. After standing at room temperature for 48 hours a small amount of insoluble material was removed and the filtrate concentrated dry in vacuo. The residue was slurried with 50 cc. of water (at 50° C.) cooled to 2° C. overnight, filtered, washed with ice water and dried. The weight of product obtained was 32.5 g.; M. P. 151° C.; yield 63.1% of theory.

Recrystallization from benzene - petroleum ether gave pale yellow needles of 2-amino-3,4-dihydroquinoxaline; M. P. 151° C. Anal. Calc'd for $C_8H_9N_3$: C, 65.27; H, 6.16; N, 28.54. Found: C, 65.12; H, 6.08; N, 28.63.

Example 17

The cyclization reaction was carried out substantially as described in Example 16 except that the nitrile was dissolved in the sodium methylate solution at 60° C., the resulting solution maintained at 60° C. for one hour, and then allowed to stand overnight at room temperature. The yield of 2-amino-3,4-dihydroquinoxaline obtained by this procedure was 47% of theory.

Example 18

A mixture of 0.5 g. of 2-amino-3,4-dihydroquinoxaline, 0.05 g. of 10% palladium on Norit (an activated charcoal product) and 7 cc. of tetralin was refluxed for one hour. After filtration from the catalyst, the filtrate was cooled and the resulting precipitate collected and washed with petroleum ether. This material was extracted with 2.5 N hydrochloric acid and the filtrate neutralized with sodium hydroxide. The pale yellow needles (weight 0.15 g.), which separated, melted at 154–156° C. and a mixture with authentic 2-aminoquinoxaline melted at the same temperature.

Example 19

14.7 g. of 2-amino-3,4-dihydroquinoxaline was dissolved in a hot solution containing 5 g. of sodium hydroxide in 150 cc. of water, and 21 cc. of 30% hydrogen peroxide was added portionwise to this solution over 15 minutes at 80–85° C. The resulting solution was maintained at 80° C. for five minutes longer, then cooled to 2° C. The resulting crystals were collected, washed with ice water and dried. The weight of 2-aminoquinoxaline obtained was 7.2 g.; M. P. 153–154° C.; yield 50.0% of theory.

Example 20

21.4 g. of 2-amino-3,4-dihydroquinoxaline was dissolved in 400 cc. of warm water, and a hot solution of 99 g. of potassium ferricyanide in 250 cc. of 10% sodium hydroxide added—the temperature of the mixture was 70° C. Crystallization began at once, and after standing for ½ hour, the mixture was cooled to 5° C. and filtered. The crystals were washed with ice water and dried, to produce 13.0 g. of 2-aminoquinoxaline; M. P. 151.5–153.5° C.; yield 61% of theory.

Example 21

A suspension of N-(o-aminophenyl)-glycine nntrile (7.4 g., 0.05 mole) in 65 cc. of methanol was treated with a solution of 3.1 g. (0.0755 mole) of sodium hydroxide in 75 cc. of methanol. After standing at room temperature for 24 hours, the solution was concentrated to dryness under vacuum (nitrogen atmosphere) and the residual material slurried with 30 cc. of water. The slurry was cooled to 0–5° C. overnight and then filtered, washed and dried. The direct yield of 2-amino-3,4-dihydroquinoxaline was 4.8 g. (65.6% of theory); M. P.=135–143° C.

Example 22

Cyclization was carried out as described in Example 21 and the resulting solution was treated directly, without concentrating, with 0.1 g. finely ground $FeCl_2.4H_2O$ and a hydrogen peroxide solution prepared by diluting 5.2 cc. of 30% hydrogen peroxide to 17 cc. with water. The methanol solution containing the iron catalyst was stirred and held at 25–30° C. while the hydrogen peroxide was added portionwise over a 2 hour period. 0.5 g. of activated charcoal (Norit) was added and the mixture was filtered. The filtrate was concentrated to a volume of 50 cc., 50 cc. of water added and the mixture again concentrated to a volume of 50 cc. The slurry was refrigerated overnight and then filtered, washed and dried. A direct yield of 4.5 g. (61.7% of theory) was obtained. This material formed pale cream-colored needles which melted at 154.5–155.8° C. A slightly less pure second crop raised the yield to 70% of theory.

Example 23

A suspension of 7.4 g. (0.05 mole) of N-(o-aminophenyl)-glycine nitrile in 65 cc. of methanol was stirred and treated with a solution of 3.1 g. (0.055 mole) of KOH in 50 cc. of methanol (nitrogen atmosphere). The clear solution which soon resulted was allowed to stand at room temperature for 20 hours, then concentrated to dryness under a nitrogen atmosphere and under reduced pressure. The residue was slurried with 30 cc. of water and the slurry cooled to 0° C. for a few hours. The solid was collected by filtration, washed with ice water and dried in vacuo. Weight=5.5 g. or 74.3% of theory; M. P.=140–142° C. This material crystallized from ethyl acetate in hard prisms typical of 2-amino-3,4-dihydroquinoxaline.

Example 24

N-(o-aminophenyl)-glycine nitrile was treated as described in Example 23, but with the addition of 17 cc. of water (15% methanol volume). After standing 24 hours at room temperature a small sample was worked up to give 2-amino-3,4-dihydroquinoxaline; M. P.=138–142° C. The rest of the solution was oxidized as described in Example 22. A 43.8% yield of 2-aminoquinoxaline (M. P.=155–156° C.) was obtained. This yield is about 20% lower than is obtained under anhydrous conditions.

Example 25

A suspension of 6.6 g. (0.045 mole) of N-(o-aminophenyl)-glycine nitrile in 56 cc. of methanol was treated with a mixture of 22 g. of 38% aqueous solution of trimethylbenzylammonium hydroxide (0.05 mole) and 45 cc. of methanol and the mixture was allowed to stand at room temperature for 24 hours. One half of the resulting solution was oxidized as described in Example 22 using 0.03 finely ground $FeCl_2.4H_2O$ and 2.3 cc. of 30% hydrogen peroxide (Superoxol) diluted to 7 cc. with water. After concentration to small volume and dilution with water, nicely crystalline 2-aminoquinoxaline separated. The weight was 1.8 g. or 55% of theory; M. P.=153–155° C.

Example 26

7.73 g. (0.045 mole) of trimethylphenylammonium chloride were added to a solution of 0.92 g. (0.04 mole) of sodium in 45 cc. of methanol. The sodium chloride which precipitated was removed by filtration and the methanol solution of trimethylphenylammonium hydroxide was added to a suspension of 6.6 g. (0.045 mole) of N-(o-aminophenyl)-glycine nitrile in 56 cc. of methanol. After 24 hours at room temperature under a nitrogen atmosphere, the resulting solution was divided in halves and one of these oxidized as described in Example 22. The yield of 2-aminoquinoxaline was 2.0 g. (61.2% of theory); M. P.=155–156° C.

Example 27

A suspension of 66.3 g. (0.45 mole) of N-(o-aminophenyl)-glycine nitrile in 563 cc. of methanol was stirred at room temperature, nitrogen was bubbled thru the mixture and a cold solution of 27.9 g. (0.497 mole) of potassium hydroxide in 450 cc. of methanol was added. The temperature remained unchanged and after about 10 minutes a clear solution resulted. The nitrogen stream and stirring was then discontinued and the resulting solution was allowed to stand in a closed flask at room temperature for 24 to 30 hours.

0.6 g. of finely ground $FeCl_2.4H_2O$ was added to the cyclization solution. 46.5 cc. of Superoxol (which contained 15.35 g. of hydrogen peroxide) was diluted to 150 cc. with water and this solution was added in 15 cc. portions to the cyclization solution. The mixture was stirred and the temperature held between 25 and 30° C. by slight cooling. Between additions, the reaction mixture was stirred until the hydrogen peroxide was entirely consumed. After the addition was complete, the reaction mixture was stirred until a negative peroxide test was obtained; the total time required for the oxidation was approximately 2 to 3 hours.

3 g. of activated charcoal (Norit) was added to the reaction mixture and the mixture was stirred for 15 minutes. The mixture was then filtered and the charcoal cake was washed with 50 cc. of methanol. The filtrate and washings were combined and concentrated under reduced pressure at a temperature of 40° C. until the volume was 500–600 cc. 300 cc. of water was added and the distillation continued until the volume was again 600 cc. Crystallization occurred toward the end of the concentration and the slurry became so thick as to impede concentration if the inside temperature was allowed to fall below 40° C. The slurry was cooled to 0–5° C. for at least two hours before filtering. The product was washed free of hydroxyl ion with about 250 cc. of ice water and dried at 65° C. to produce 42.5 to 44.5 g. of ivory-colored matted needles of 2-aminoquinoxaline; M. P. 154.5–156° C.; yield 65–68% of theory.

*Example 28*

66.3 g. of N-(o-aminophenyl)-glycine nitrile was treated as described in Example 27, except that the KOH-methanol solution was replaced by a sodium methylate solution prepared by adding 450 cc. of methanol, gradually at first, to 11.25 g. (0.489 atom) of sodium. After stirring at room temperature for 24 to 30 hours, the cyclization solution was oxidized as described in Example 25 to produce approximately 45 g. of substantially pure 2-aminoquinoxaline; M. P. 154.5–156° C.; yield approximately 68% of theory.

*Example 29*

0.6 g. of finely ground $FeCl_2 \cdot 4H_2O$ was added to a cyclization solution prepared from 66.3 g. of N-(o-aminophenyl)-glycine nitrile as described in either Example 27 or 28. The resulting mixture was stirred at 0–5° C. (the low temperature minimizes loss of methanol and danger of an explosive air-methanol mixture) and dry carbon dioxide-free air was passed in slowly for 15 to 24 hours. 3 g. of activated charcoal (Norit) was added and the mixture worked up as described in Example 27 to produce about 45 g. of 2-aminoquinoxaline. Yield approximately 68% of theory.

*Example 30*

A cyclization solution prepared as described in Example 28 from 17.1 g. (0.116 mole) of N-(o-aminophenyl)-glycine nitrile in 145 cc. methanol plus 2.9 g. (0.126 atom) sodium in 116 cc. of methanol, was treated with 2.5 N HCl until the solution was no longer alkaline to phenolphthalein (ca. 53 cc. required). 68.5 g. of ferric chloride hexahydrate was added and the mixture let stand for 15 minutes (temperature rose a few degrees). 5.0 g. of filter cel (Supercel) and then 30% sodium hydroxide were added until the mixture was alkaline to phenolpthalein (ca. 82 cc. required). The slurry of ferrous hydroxide was heated to 75° C. and filtered thru filter cel (Supercel). The residue was washed with 50 cc. of hot methanol. The filtrates were combined and concentrated until quite thick with precipitated 2-aminoquinoxaline. The slurry was cooled to 0–5° C. for one hour, filtered and the filter cake washed free of sodium hydroxide and dried. The weight of 2-aminoquinoxaline was 2.8 g. (46.5% of theory); M. P.= 148–150° C.

*Example 31*

1.47 g. (.01 mole) of 2-amino-3,4-dihydroquinoxaline was dissolved in 6 cc. of water plus 4 cc. of 2.5 N HCl. 2.00 cc. of 30% aqueous hydrogen peroxide (Superoxol) was added and the mixture held at room temperature for 10 minutes. 8 cc. additional 2.5 N HCl was added to the solution and the solution was then warmed to 80° C. for 2–3 minutes. The reaction solution was cooled and made alkaline with 4–5 cc. of 30% sodium hydroxide solution. The precipitated material was recovered by filtration, washed with water and dried. The weight of 2-aminoquinoxaline was 1.2 g. (82.0% of theory), M. P.=149–152° C. A mixed M. P. with authentic 2-aminoquinoxaline was not depressed.

*Example 32*

A suspension of 7.3 g. of N-(o-aminophenyl)-glycine nitrile in 63 cc. of methanol was treated with a solution of 1.3 g. of sodium in 50 cc. of methanol and the resulting mixture cooled to 0° C. and, with stirring, subjected to a stream of dry carbon dioxide free air. After 48 hours 50 cc. of water was added and the reaction mixture was concentrated to a volume of about 50 cc. The slurry was refrigerated overnight and then filtered, washed and dried. The yield of 2-aminoquinoxaline of M. P.=149–154° C. was 3.7 g. or 51% of theory.

*Example 33*

A cyclization solution, prepared as described in Example 27, from 1.47 g. (.01 mole) of N-(o-aminophenyl)-glycine nitrile in 12.5 cc. methanol plus 0.25 g. sodium in 10 cc. of methanol, was allowed to stand 24 hours and then stirred at room temperature while oxygen was bubbled through the solution. After 1½ hours of bubbling, the solution was allowed to stand overnight and was then concentrated dry under vacuum. 10 cc. of water was added and the resulting slurry was cooled in ice for ½ hour, filtered, the filter cake washed with water and dried. The yield of 2-aminoquinoxaline of M. P.=153–155° C. was 0.82 g. or 56.5% of theory.

*Example 34*

4-methyl-1,2-diaminobenzene, formaldehyde and hydrogen cyanide were reacted together according to substantially the same procedure employed in the case of o-phenylenediamine and described in Example 3. The crystalline product thus obtained was dried to produce the corresponding N-(2-amino-methylphenyl)-glycine nitrile in a yield of approximately 86.3% of theory.

16.1 gms. of this ntrile was added to a solution containing 6.2 gms. of potassium hydroxide dissolved in 135 cc. of methanol, and the resulting solution was allowed to stand under a nitrogen atmosphere at room temperature for about 48 hours thereby forming the corresponding 2-amino-methyl-3,4-dihydroquinoxaline. This compound can be isolated, if desired by evaporating the methanol under reduced pressure, triturating the residue with water, filtering the crystalline slurry thus obtained and drying the crystalline product.

0.13 gm. of finely ground ferrous chloride tetrahydrate was, however, added to the methanolic reaction solution without further treatment thereof, and a solution of 10.3 cc. of Superoxol diluted to 35 cc. with water was then added to this reaction solution over a period of 1 hour while maintaining the reaction temperature at approximately 30° C. The reaction mixture was then stirred for an additional 1 hour period and a trace of sodium sulfite was then added thereto to destroy excess hydrogen peroxide. The solution was treated with activated charcoal, filtered and evaporated to a volume of approximately 100 cc. About 65 cc. of water was then added to this concentrated solution and the resulting solution again concentrated to 100 cc. whereupon a crystalline product separated. This product was recovered by filtration, washed and dried to produce about 9.5 gms. of the corresponding 2-aminomethylquinoxaline; M. P. 170–173° C.

This product was purified by recrystallization from benzene to produce substantially pure material; M. P. 174–175.5° C. Anal. Calc'd for $C_9H_9N_3$; C, 67.90; H, 5.70. Found: C, 68.01; H, 5.66.

*Example 35*

3-methyl-1,2-diaminobenzene, formaldehyde and hydrogen cyanide were reacted together according to substantially the same procedure employed in the case of o-phenylenediamine and described in Example 3. The crystalline product thus obtained was dried to produce the corresponding N-(2-amino-methylphenyl)-glycine nitrile in a yield of approximately 61% of theory; M. P. 74–84° C.

24.75 gms. of this nitrile was dissolved in 92 cc. of menthanol containing 8.6 gms. of potassium hydroxide and the solution was allowed to stand at room temperature under nitrogen for about 72 hours. The dihydroquinoxaline present in this solution is isolated by evaporating the nitrile under reduced pressure, triturating the residual material with water, filtering the crystalline slurry thus obtained, and drying to produce the corresponding 2-amino-methyl-3,4-dihydroquinoxaline.

Instead of isolating the dihydroquinoxaline, however, the methanolic reaction solution obtained above was oxidized as follows: 0.2 gm. of ferrous chloride tetrahydrate was added to the reaction solution, and a solution of 15.8 cc. of Superoxol (diluted to 51 cc. with water) was then added to this reaction solution over a period of 1 hour while the temperature was maintained at approximately 30° C. The reaction mixture was then stirred for an additional 1 hour period and a trace of sodium sulfate was added thereto to destroy excess hydrogen peroxide. The solution was treated with activated charcoal, filtered and evaporated to a volume of approximately 150 cc. About 75 cc. of water was then added to this solution and the resulting solution again concentrated to about 150 cc. whereupon a crystalline product separated. This product was recovered by filtration, washed and dried to produce a 51% yield of the corresponding 2-amino-methylquinoxaline; M. P. 129–131° C. This product was purified by recrystallization from benzene to produce substantially pure 2-amino-methylquinoxaline monohydrate; M. P. 135–136° C. Anal. Calc'd for $C_9H_{11}N_3O$: C, 61.10; H, 6.26; N, 23.70. Found: C, 61.33; H, 5.95; N, 23.30. After drying at 100° C. at 1–2 mm. pressure, anhydrous material of the same M. P. was obtained. Anal. Calc'd for $C_9H_9N_3$: C, 67.90; H, 5.70. Found: C, 68.01; H, 5.79.

According to this process only one isomer (either the 5 or 8 methyl derivative) was obtained. From stereochemical considerations it appears likely that the particular isomer obtained according to the foregoing procedure was 2-amino-8-methylquinoxaline. The corresponding precursors would therefore be 2-amino-8-methyl-3,4-dihydroquinoxaline and N-(2-amino-3-methylphenyl)-glycine nitrile (M. P. 74–84° C.). The other isomer, which has been prepared by a modified procedure, melts at 202–203° C. and appears to be 2-amino-5-methyl-quinoxaline.

*Example 36*

3.56 gms. (0.25 mole) of 4-chloro-1,2-diaminobenzene were heated with 2.85 gms. (0.25 mole) of 50% aqueous glycolonitrile solution for a period of 1 hour at a temperature of approximately 100 C. 7.5 cc. of isopropanol was added to the hot reaction solution, activated charcoal was added to the resulting mixture which was filtered hot and the filtrate cooled in ice. The crystalline product which separated was recovered by filtration and dried to produce a mixture of N-(2-amino-4-chlorophenyl)-glycine nitrile and N-(2-amino-5-chlorophenyl)-glycine nitrile; M. P. 81.5–85.5° C.; yield approximately 31% of theory.

2.6 gms. of this nitrile was mixed with 0.9 gm. of potassium hydroxide and 23 cc. of methanol and the resulting solution allowed to stand under nitrogen for 3 days.

The resulting solution is evaporated to dryness under reduced pressure, the residual material triturated with water and the crystalline product filtered and dried to produce a mixture of 2-amino-6-chloro-3,4-dihydroquinoxaline and 2-amino-7-chloro-3,4-dihydroquinoxaline.

Alternatively 0.2 gm. of finely ground ferrous chloride tetrahydrate were added to the reaction solution followed by a solution containing 1.5 cc. of Superoxol diluted to 5 cc. with water. After the resulting solution had been allowed to stand for 15 minutes, crystals began to separate and after 45 minutes all of the peroxide had been consumed. Two different isomeric products were obtained by fractional crystallization of this reaction mixture; the first (27% of theory) melted at 215–216° C. and after purification by recrystallization from alcohol yielded needles melting at 217–219° C. The second crop (22% of theory) recovered from this liquor melted at 185–190° C.

Analysis of the isomer melting at 215–216° C. Calc'd for $C_8H_6N_3Cl$: C, 53.49; H, 3.73. Found: 53.22; H, 3.50. One of the above isomers is 2-amino-6-chloro-quinoxaline whereas the other isomer is 2-amino-7-chloro-quinoxaline.

*Example 37*

4-methoxy-1,2-diaminobenzene, formaldehyde and hydrogen cyanide were reacted together according to substantially the same procedure employed in the case of o-phenylenediamine and described in Example 3. The crude material obtained according to this procedure was gum from which the corresponding N-(2-amino-methoxyphenyl)-glycine nitrile was obtained as a semisolid in about 50% yield after digestion with chloroform and benzene mixtures.

A solution containing about 17.7 gms. of this nitrile and 6.2 gms. of potassium hydroxide in 210 cc. of methanol was allowed to stand at room temperature under nitrogen for 3 days.

This solution is evaporated under reduced pressure, the residual material is triturated with water and the crystalline product thus obtained recovered by filtration and dried to produce the corresponding crude 2-amino-methoxy-3,4-dihydroquainoxaline.

Instead of isolating the dihydroquinoxaline compound, however, 0.13 gm. of finely ground ferrous chloride tetrahydrate was added to the methanolic reaction solution without further treatment thereof, and a solution containing 10.3 cc. of Superoxol diluted to 33 cc. with water was then added to this reaction solution over a period of 1 hour while maintaining the reaction temperature at approximately 30° C. The reaction mixture was then stirred for an additional 1 hour period and a trace of sodium sulfite was added thereto to destroy excess hydrogen peroxide. The solution was treated with activated charcoal, filtered and evaporated to a volume of approximately 100 cc. About 65 cc. of water was then added to this concentrated solution and the resulting solution again concentrated to 100 cc. whereupon a crystalline product separated. This product was recovered by filtration, washed and dried to produce the corresponding 2-amino-methoxy-quinoxaline; M. P. 200–205° C.; yield approximately 72% of theory. This product was purified by repeated precipitation from dilute hydrochloric acid solution followed by recrystallization from alcohol to produce pale yellow feathery needles; M. P. 216.5–217.5° C. Anal. Calc'd for $C_9H_9ON_3$: C, 61.70; H, 5.20. Found: C, 61.99; H, 5.21.

*Example 38*

66.3 g. of purified N-(o-aminophenyl)-glycine nitrile, having a M. P. of 110–111° C. and a purity of about 95% by solubility analysis, was dissolved in 600 cc. of methanol containing 13.5 g. of potassium hydroxide and the solution was maintained at 35–40° C. for 17 hours under a nitrogen atmosphere. The resulting mixture was oxidized using 10% hydrogen peroxide and ferrous chloride in the usual manner, thereby producing 2-amioquinoxaline (M. P.=156–157.5° C.) which was isolated in a yield of 85% of theory.

Various changes and modifications may be made in carrying out the present invention without departing from the spirit and scope thereof. Insofar as these changes and modifications are within the scope of the annexed claims, they are to be considered as part of our invention.

We claim:

1. The process of preparing 2-amino-3,4-dihydroquinoxaline compounds which comprises reacting a methanolic solution of a strong base with the corresponding N-(o-aminophenyl)-glycine nitrile compound having the formula:

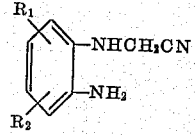

wherein $R_1$ and $R_2$ are nuclear substituents selected from the class which consists of hydrogen, halo, alkyl and alkoxy radicals.

2. The process of preparing 2-amino-3,4-dihydroquinoxaline which comprises reacting N-(o-aminophenyl)-glycine nitrile with a methanolic solution of a strong base.

3. The process of preparing 2-amino-6-chloro-3,4-dihydroquinoxaline which comprises reacting N-(2-amino-5-chlorophenyl)-glycine nitrile with a methanolic solution of a strong base.

4. The process of preparing 2-amino-7-chloro-3,4-dihydroquinoxaline which comprises reacting N-(2-amino-4-chlorophenyl)-glycine nitrile with a methanolic solution of a strong base.

5. The process of preparing 2-amino-3,4-dihydroquinoxaline which comprises reacting N-(o-aminophenyl)-glycine nitrile with a methanolic solution of an alkali metal alcoholate.

6. The process of preparing 2-amino-3,4-dihydroquinoxaline which comprises reacting N-(o-aminophenyl)-glycine nitrile with a methanolic solution of an alkali metal hydroxide.

7. The process of preparing 2-amino-3,4-dihydroquinoxaline which comprises reacting N-(o-aminophenyl)-glycine nitrile with a substantially anhydrous methanolic solution of potassium hydroxide.

8. The process of preparing 2-amino-8-methyl-3,4-dihydroquinoxaline which comprises reacting N-(2-amino-3-methylphenyl)-glycine nitrile with a methanolic solution of a strong base.

9. The process which comprises reacting N-(2-amino-methoxyphenyl)-glycine nitrile with a methanolic solution of a strong base to produce 2-amino-methoxy-3,4-dihydroquinoxaline.

10. 2-amino-3,4-dihydroquinoxaline compounds of the formula:

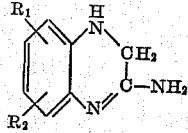

wherein $R_1$ and $R_2$ are nuclear substituents of the class which consists of hydrogen, halo, alkyl and alkoxy radicals.

11. 2-amino-3,4-dihydroquinoxaline.
12. 2-amino-6-chloro-3,4-dihydroquinoxaline.
13. 2-amino-7-chloro-3,4-dihydroquinoxaline.
14. 2-amino-8-methyl-3,4-dihydroquinoxaline.
15. 2-amino-methoxy-3,4-dihydroquinoxaline.

KARL PFISTER III.
JOHN WEIJLARD.

No references cited.